United States Patent
Lilienblum et al.

(10) Patent No.: US 9,418,449 B2
(45) Date of Patent: Aug. 16, 2016

(54) DEVICE AND METHOD FOR MEASURING SURFACES

(75) Inventors: Tilo Lilienblum, Magdeburg (DE); Wolfram Schmidt, Stadt Falkenstein (DE)

(73) Assignee: INB Vision AG, Magdeburg (DE)

( * ) Notice: Subject to any disclaimer, the term of this patent is extended or adjusted under 35 U.S.C. 154(b) by 417 days.

(21) Appl. No.: 14/110,585

(22) PCT Filed: Mar. 14, 2012

(86) PCT No.: PCT/DE2012/200014
§ 371 (c)(1),
(2), (4) Date: Nov. 18, 2014

(87) PCT Pub. No.: WO2012/139570
PCT Pub. Date: Oct. 18, 2012

(65) Prior Publication Data
US 2015/0078651 A1    Mar. 19, 2015

(30) Foreign Application Priority Data

Apr. 14, 2011 (DE) .......................... 10 2011 017 047
Sep. 14, 2011 (DE) .......................... 10 2011 113 138

(51) Int. Cl.
*G06K 9/00*    (2006.01)
*G06T 7/60*    (2006.01)
(Continued)

(52) U.S. Cl.
CPC ............... *G06T 7/604* (2013.01); *G01B 11/24* (2013.01); *G01B 21/20* (2013.01); *G01B 21/30* (2013.01); *G06T 2207/20024* (2013.01)

(58) Field of Classification Search
None
See application file for complete search history.

(56) References Cited

U.S. PATENT DOCUMENTS 4,792,232 A    12/1988    Jobe et al.
7,088,442 B2    8/2006    Hassler et al.
(Continued)

FOREIGN PATENT DOCUMENTS

CN    101356417 A    1/2009
DE    10062251 A1    7/2002
(Continued)

OTHER PUBLICATIONS

The International Bureau of WIPO, International Preliminary Report on Patentability (English Translation of the ISA's Written Opinion) for International Application No. PCT/US2012/200014, issued Oct. 15, 2013, 5 pages, Switzerland.
(Continued)

*Primary Examiner* — Hadi Akhavannik
(74) *Attorney, Agent, or Firm* — Alston & Bird LLP (57) ABSTRACT

According to the invention, a method for detecting and measuring local shape deviations in flat, curved, or domed surfaces of a test object, wherein three-dimensional measurement data (D) of the surfaces are evaluated by means of an evaluating apparatus, is designed and further developed, with regard to nondestructive testing of test objects with objective and easy-to-interpret assessment results, in such a way that the evaluating apparatus uses at least one virtual filter element as a concave filter for detecting concave sub-areas in flat or convex surfaces and/or as a convex filter for detecting convex sub-areas in flat or concave surfaces, that the filter element determines magnitudes of the shape deviations, and that said magnitudes are output by means of an outputting apparatus as measured values. The invention specifies a device for performing a corresponding method.

22 Claims, 6 Drawing Sheets

(51) Int. Cl.
  *G01B 21/20* (2006.01)
  *G01B 21/30* (2006.01)
  *G01B 11/24* (2006.01)

(56) References Cited

U.S. PATENT DOCUMENTS

| | | | |
|---|---|---|---|
| 7,359,538 B2* | 4/2008 | Zeng | G06T 7/0012 128/922 |
| 7,639,884 B2* | 12/2009 | Iguchi | H04N 19/85 382/232 |
| 2006/0093217 A1* | 5/2006 | Hong | G06K 9/00201 382/181 |
| 2009/0048699 A1 | 2/2009 | Jahn | |

FOREIGN PATENT DOCUMENTS

| DE | 102006001496 A1 | 7/2007 |
|---|---|---|
| EP | 0921374 B1 | 4/2005 |
| JP | 2002-048527 A | 2/2002 |
| WO | WO 02/48670 A2 | 6/2002 |
| WO | WO 2008/033090 A1 | 3/2008 |

OTHER PUBLICATIONS

Bronhstein, I. N., et al., "7.1.5.1. Methode der kleinsten Quadrate," *Taschenbuch der Mathematik*, 24th Edition, 1989, p. 787, Leipzig: BSB Teuber.

Bresenham, J. E., "Algorithm for Computer Control of a Digital Plotter," *IBM Systems Journal*, Mar. 1965, pp. 25-30, vol. 4, Issue 1, IBM Corporation, USA.

"Water Geometery Characteristics," Jul. 24, 2005, Retrieved from <http://www.hologenix.com/Wafer-Geo-Characteristics.pdf> on Apr. 12, 2007, 14 pages.

International Searching Authority, International Search Report (ISR) and Written Opinion for International Application No. PCT/DE2012/200014, mailed Jun. 8, 2012, 12 pages, European Patent Office, The Netherlands.

State Intellectual Property Office of the P.R.C., Notice of First Office Action for Application No. 201280017957.6, May 19, 2015, 5 pages, China.

* cited by examiner

DEVICE AND METHOD FOR MEASURING SURFACES

CROSS REFERENCE TO RELATED APPLICATIONS

This application is a national stage application, filed under 35 U.S.C. §371, of International Application No. PCT/DE2012/200014, filed Mar. 14, 2012, which claims priority to and the benefit of German Application No. 10 2011 017 047.2, filed Apr. 14, 2011, and German Application No. 10 2011 113 138.1, filed Sep. 14, 2011, the contents of all of which are hereby incorporated by reference in their entirety.

BACKGROUND

1. Technical Field

The present invention relates to a method for detecting and measuring local deviations in the shape of planar, curved, or arched surfaces of a test object, with three-dimensional measurements of the surfaces being evaluated with an evaluation device. Further, the present invention relates to a device for detecting and measuring local deviations in the shape of planar, curved, or arched surfaces of a test object, comprising an evaluation device for evaluating three-dimensional measurements.

2. Description of Related Art

Various devices and methods are known in prior art for the detection or measuring of local deviations in the shape of designed and/or functional surfaces. On the one hand, there are manual or contacting methods, and on the other hand optic measuring methods with different evaluation methods.

With regards to the manual methods, a thin polishing of the surface is known via an abrasive block or a flexible pad. Through the thin polishing process, local elevations or recesses as well as concave sections on a surface become visible. They can be detected by the human eye. However, here it is problematic that such methods are only suitable for metallic surfaces and in this case any potential anti-corrosive coating on the surface is damaged. Further, this method requires a trained auditor and additionally it is time-consuming. A manual sensing of a surface via specialty gloves is also known. Here, the auditor detects uneven sections on the surface. It is problematic, though, that it represents a subjective method, which can only be executed by a trained auditor and is also time-consuming. Another method of prior art is the straight edge, the visual inspection of a raw and enameled surface or methods with respective reflections of a projected pattern on a surface. Here, patterns are reflected and potential irregularities of the surface can be rendered visible. In this method the subjectivity as well as the correspondingly long time required are problematic.

Using optic measuring methods allows for possible three-dimensional measuring of surfaces and subsequently the detection and measurement of local deviations from the shape of the surface. For example, the CAD-comparison is known from prior art. Here, the difference between points of 3D-measurements and the CAD-data is calculated and evaluated. Here it is problematic that not only local, but also global deviations are displayed, which regularly exceed the local deviations and mask them.

Further, the method of an associative memory is known from EP 0 921 374 B1. This represents a special, artificial neuronal network. In a calibration process, flawless parts are measured. Using these measurements, the artificial neuronal network is then trained and, upon recalling the network with the measurements of the calibration parts, the errors occurring in the test parts are smoothened. In a subsequent differentiation with the original data, these errors are detected and measured. Here it is disadvantageous that the method can only be used when flawless parts or suitable parts are available.

Further, the method of polynomial approximation is known. Here, measurements are approximated with the help of polynomials or similar methods, by which the data is smoothened. Thereafter the difference between the smoothened data and the original data is calculated, allowing a detection and measurement of flawed sections. Here it is disadvantageous that, particularly in the area of design elements or edges of objects, artifacts can develop, because they are also smoothened. This leads to a poor interpretation of the measuring results by the auditors. Additionally, a mathematical analysis of known flaws can occur by assessing a cross-section through the 3D-data. Here, the difference is shown in reference to an interactively stored line in the data. It is problematic, though, that only known error sections can be analyzed. The evaluation of data cannot be done automatically, but requires trained personnel. A comprehensive assessment of a surface is not possible here.

Finally, the analysis of a curvature is known in prior art. Here, the thin polishing of the surface with an abrasive block can be approximated by a one-dimensional calculation of the curvature based on the 3D-data. However, this method requires the precise knowledge of the extension of the flaw. Further, the result is not equivalent to an image known to the auditor, which he/she obtains after the treatment with an abrasive block.

BRIEF SUMMARY

The present invention is therefore based on the objective to embody and further develop a method and a device of the type mentioned at the outset such that a non-destructive examination of test objects is possible using objective and easily interpreted evaluation results.

According to the invention, the above-mentioned objective is attained in a method showing the features of claim 1. With reference to a device according to the invention, the above-stated objective is attained in the features of the independent claim 21.

Here it is of particular importance for the method that the evaluation device uses at least one virtual filter element as a concave filter to detect concave partial sections in planar or convex surfaces and/or as a convex filter for detecting convex partial sections in planar or concave surfaces, that the filter element determines the extent of the deviating form, and that this is displayed via a display device as a measurement.

In the following, the three-dimensional measurements to be evaluated by the evaluation device or the measuring points and the amounts of the deviating forms determined with the concave or the convex filter shall be called measurements.

It has first been recognized according to the invention that a non-destructive examination of test objects is possible when the evaluation device shows at least one virtual filter element. According to the invention, the virtual filter element can be used as a concave filter for detecting concave partial sections in planar or convex surfaces and/or as a convex filter for detecting convex partial sections in planar or concave surfaces. This way, surfaces can be tested and deviations in the form can be detected. With the ability for use as concave filters or convex filters, an adjustment to the respective measuring task is possible. Further, a test object can be measured once from a concave and a convex side and/or via successive measurements. With regards to obtaining objective assessment results, the filter element determines amounts of the deviation from the form and these are displayed as measurements via a display device. By the values of the deviation from the form determined, it is possible for the auditor to render an objective assessment. Due to the selected calculation method representing a thin polishing of a test object using a cutting block or a pad, a simple form of interpretation of the measurements is possible.

Consequently, the method according to the invention and the device according to the invention and a device of the type mentioned at the outset are embodied and further developed such that a non-destructive examination of test objects is ensured with objective and easily interpreted evaluation results.

With regards to the display device, it is possible that said display device represents a computer monitor or a printer. Further, it is possible to project the measurements by a projector on the test object. This way, the deviations in the form can be marked directly on the test object.

In the concrete case the filter element may be embodied as a straight section or as a planar element. Here, the filter element is selected based on the measuring task and/or the measurements according to the requirements. It is possible that the size, shape, and/or orientation of the filter element are defined in reference to the 3D-measurements. Further, the filter element can be equivalent to an abrasive block with regards to form and dimensions, by which local deviations in the form can be rendered discernible by way of thin polishing. The filter element shows a center of gravity which is preferably in the middle of the filter element.

With regards to the orientation of the filter element, it is advantageous to be oriented parallel to the measurements as much as possible. This can occur via compensation straight or compensation level through a presently observed measuring point and several surrounding measuring points of the measurements. The compensation can occur, for example using the least square method and is described for example in Bronstein, Taschenbuch der Mathematik (paperback of mathematics), 24th Edition, Leipzig: BSB Teuber 1989, page 787. This is hereby included in the disclosure of the present application by way of reference. The incline and/or the orientation are determined for the compensation straight or the compensation plane, which may also be called compensation area. The filter element is rotated or positioned such that it shows the same incline and is arranged largely parallel in reference to the measurements. In another advantageous manner, the filter element can be aligned with regards to the measuring points of the measurements respectively such that the actually observed measuring point is located on the normal of the filter element. The normal is defined starting at the center of gravity of the filter element. When the filter element is embodied as a planar element, the normal is positioned perpendicular in reference to the planar element. In other words, the normal represents the normal vector of the planar element. When the filter element is embodied as a straight section, the normal is also aligned perpendicular in reference to the straight section and indicates or extends through the selected or observed 3D-measuring point.

In an advantageous manner, at least one measuring point of the measurements, which shows the shortest distance from the filter element, is defined as the supporting point. In the case of a straight section, at least one supporting point is calculated such that on each side of the center of gravity of the straight section the measuring point with the shortest distance from the straight section is defined as the supporting point. When the presently observed measuring point is located on the normal of the straight section, here the point with the shortest distance from the straight section is defined as the supporting point. This represents a special case, in which the supporting point and the presently observed measuring point coincide. When the filter element is embodied as a planar element, a segmenting occurs about the center of gravity into four quadrants. Subsequently the measuring point with the shortest distance from the planar element is determined for each quadrant. From these four determined measuring points, the three points with the shortest distance are selected as supporting points. Both in a straight section as well as a planar element, the orientation of the filter element can be newly defined by the calculated supporting points. Here, it is possible that the adjustment of the orientation is repeated until the orientation of the filter element no longer changes. In a further advantageous manner, the filter element is displaced along its normal in the direction of the measurements until the filter element is located on the supporting point. In the case of a straight section, a shifting along the normal of the straight section occurs in the direction of the presently observed measuring point. When the measuring point is different from the point with the shortest distance from the straight section, said straight section is displaced until it rests on the previously determined supporting points. When the measuring point represents the points with the shortest distance in reference to the straight section, said straight section is displaced in the direction of its normal until the straight section rests on the presently observed measuring point. In this case the supporting point and the measuring point are located over top of each other or coincide.

Concretely, the distance between the filter element and the observed measuring point can be measured in the direction of the normal of the filter element or in a defined direction. The defined direction may represent a coordinate direction, for example the z-axis of a coordinate system. By way of measuring the distance in a defined direction, the expense for calculation can be reduced.

Concretely, the concave filter can approach the surface from a convexly arched side and/or the convex filter can approach the surface from the concavely arched side. The selection between concave filters and convex filters can be predetermined by the test to be performed and by the auditor. Further, it is possible that an automatic selection occurs of concave filters or convex filters by way of analyzing the surface form of one or more parts to be tested. Further, it is possible that the selection of the concave or convex filters is calculated based on CAD-data of the part.

With regards to illustrating the calculated measurements, they can be shown in a diagram as gray values or in a colored illustration. Here, in an appropriate embodiment of the diagram, an illustration or an image can be generated which the auditor knows from his/her previous experience and can interpret, for example, thin polishing with an abrasive block or a pad. Further, the measurements can be projected by a projector on the test object. This way it is possible to directly mark deviations in the form on said test object.

With regards to a preliminary smoothing or elimination of disturbances in the measurements and/or an elimination of outliers, it is advantageous for the measurements to be filtered prior to processing with a virtual filter element comprising smoothing filters. This may represent a median filter and/or a Gauss filter. This way any disturbances in the measurements are largely removed and calculation errors can be almost excluded.

Further, the calculated measurements can be filtered after processing using a virtual filter element with high-pass and/or low-pass filters. This way, any outliers potentially developing during processing in the virtual filter element can be compensated or excluded.

With regards to a simplification and/or a reduction in data here, selected measuring points may be processed only by the filter element. Here, according to the specified level of precision, an adjustment can occur such that for example only every other measuring point is included in the evaluation. Further, for the purpose of simplification, it is possible that points are determined on the filter element, which makes it possible to evaluate the distance of this to the measurements. In this regard, the points for determining the distance can be located outside the center of gravity of the filter element. Further, with regards to a simplification, scatterplot may be used for the measurements. Here, it is possible that for a distance measurement in arbitrary directions, an approximated straight line can be described with the Bresenham-algorithm. This is disclosed in J. E. Bresenham: Algorithm for computer control of a digital plotter, IBM Systems Journal 4, 1 (1965), on pages 25-30. This (publication) is hereby included in the disclosure of the present application.

With regards to the orientation of the filter element, it is possible that the orientation of the filter element is variably predetermined for each measuring point or for selected measuring points of the measurements. This way the process used in practice is simulated to follow the contours of the exterior skin with an abrasive block.

In order to avoid any artifacts in the edge regions of the surface or in sections of the surface not to be measured, the filter element may be reduced in size. By reducing the size of the filter element, a separate treatment can occur and here the development of artifacts can largely be prevented. Here it is possible that the point for determining the distance may be located outside the center of gravity of the filter element.

In an advantageous fashion, the measurements of the convex filter can be inverted for a common illustration with the measurement of the concave filter in a diagram. A recess at the back of a surface is equivalent to an elevation at the front. This way, after an inversion of the measurements of the convex filter, a combination occurs with the measurements of the concave filter in a diagram. A respective inversion can also be performed in a colored or gray scale.

Concretely, the filter element can be located below the supporting point by a certain amount. In other words, the filter element is not resting on the highest points of the measurements, but is located below said highest points by a certain amount. The stipulation can be directly predetermined in its value by an amount to be chosen. Further, this amount may be calculated by a parameter "force". The force by which in practice, for example, an abrasive block is guided over the surface correlates to the volume removed by said polishing process. This means with regards to the present method that the planar element therefore is positioned by a certain amount below the supporting point, with the volume limited by the planar element and the surface being equivalent to a certain amount. Similarly an area applies for the straight section, the area of which is stretched by the surface and the straight section. This can be compared to the fine polishing with an abrasive block such that during the polishing process, any elevated areas are made visible by the material being removed to a greater extent and thus become reflective. This way, elevations are disclosed with the concave filter showing a different algebraic sign than the concave sections. For example, the highest points of the measurements, for instance the supporting points on which the filter element rests, no longer show the distance 0 but a respective value of a distance with a different algebraic sign. This way the polishing with an abrasive block is reproduced and resembles the illustration resulting even closer to the image known to the auditor from practice.

With regards to sizing the filter element, it is possible that the size, shape, and/or orientation of the filter element are calculated from the CAD-data. This results in an adjustment of the filter element to the surface of the test object. By way of calculation, an automatic adjustment of the filter element to the test object is realized. Further, it is possible that the selection of the concave or convex filter is calculated based on CAD-data of the part.

In another advantageous fashion, the flexibility of the filter element can be predetermined. In other words, flexibility of the filter element is permitted in order for it to adjust to the basic shape of the surface to be measured. This is equivalent to the flexible pads used in the tactile mechanic examination, by which errors in the surface form can be rendered visible.

With regards to providing measurements, they can be determined by measuring a surface as measuring points, particularly as scatterplot. Further, the measurements may be provided as geometric area data. Here, it is possible that measuring points are selected on the geometric area data.

Concretely, it is possible that the measurements to be processed and/or the calculated measurements are previously or subsequently processed via CAD-comparison, associative memory, and/or polynomial approximation.

Further, the measurements may be filtered repeatedly with different filter elements. This may relate to a combined use of a concave filter and a convex filter. Here, both filters may be used and the respective measurements be saved. In a further advantageous fashion, an overall result can be calculated from the results of the individual filtering using data fusion. In the present case, the data fusion can contribute to complement and combine potentially incomplete measurements for the purpose of data cleaning Here, the point or the determination of the distance between the filter element and the observed measuring point may be outside the center of gravity of the filter element.

With regards to using additional measurements, in addition to three-dimensional measurements, data of other dimensions or physical parameters may also be processed, for example temperature, particularly 2D-data, or 4D-data. Here, 2D-data may represent, for example, data of a linear scanner. 4D-data may represent voxel data, temporal progressions, and flow fields. Here it is possible that the dimension of the filter element is smaller by one or more dimensions than the dimension of the data to be processed.

The device according to claim 21 preferably serves for the execution of a method according to the invention. Here, it is of particular importance for the device that the evaluation device comprises at least one virtual filter element as a concave filter for detecting concave sections in planar or convex surfaces and/or as a convex filter for detecting convex sections in planar or concave surfaces and that a display unit is allocated to the evaluation device to display the measurements.

With regards to the display unit, it is possible that it represents a display unit, for example a computer monitor or a printer. Further, it is possible that the measurements are projected by a projector on the test object. This way any deviations in the form can be marked directly at the test object.

With regards to providing measurements, a device may be provided for the optic, particularly three-dimensional measurement of the test object. In other words, an optic 3D-measuring system may serve to generate or produce the 3D-data. Here, the evaluation unit may represent a stored program control or a computer.

DETAILED DESCRIPTION OF THE DRAWINGS

At this point, there are various options for embodying and implementing the teaching of the present invention in an advantageous manner. For this purpose, reference is hereby made on the one hand to the claims dependent on claim 1, and on the other hand to the following explanation of a preferred embodiment of the invention and the drawings. In the context of the explanation of the preferred exemplary embodiment of the invention and of the drawing, other generally preferred embodiments and further developments of the teaching are explained as well, The drawing shows:

DETAILED DESCRIPTION OF VARIOUS EMBODIMENTS

Figure 1:
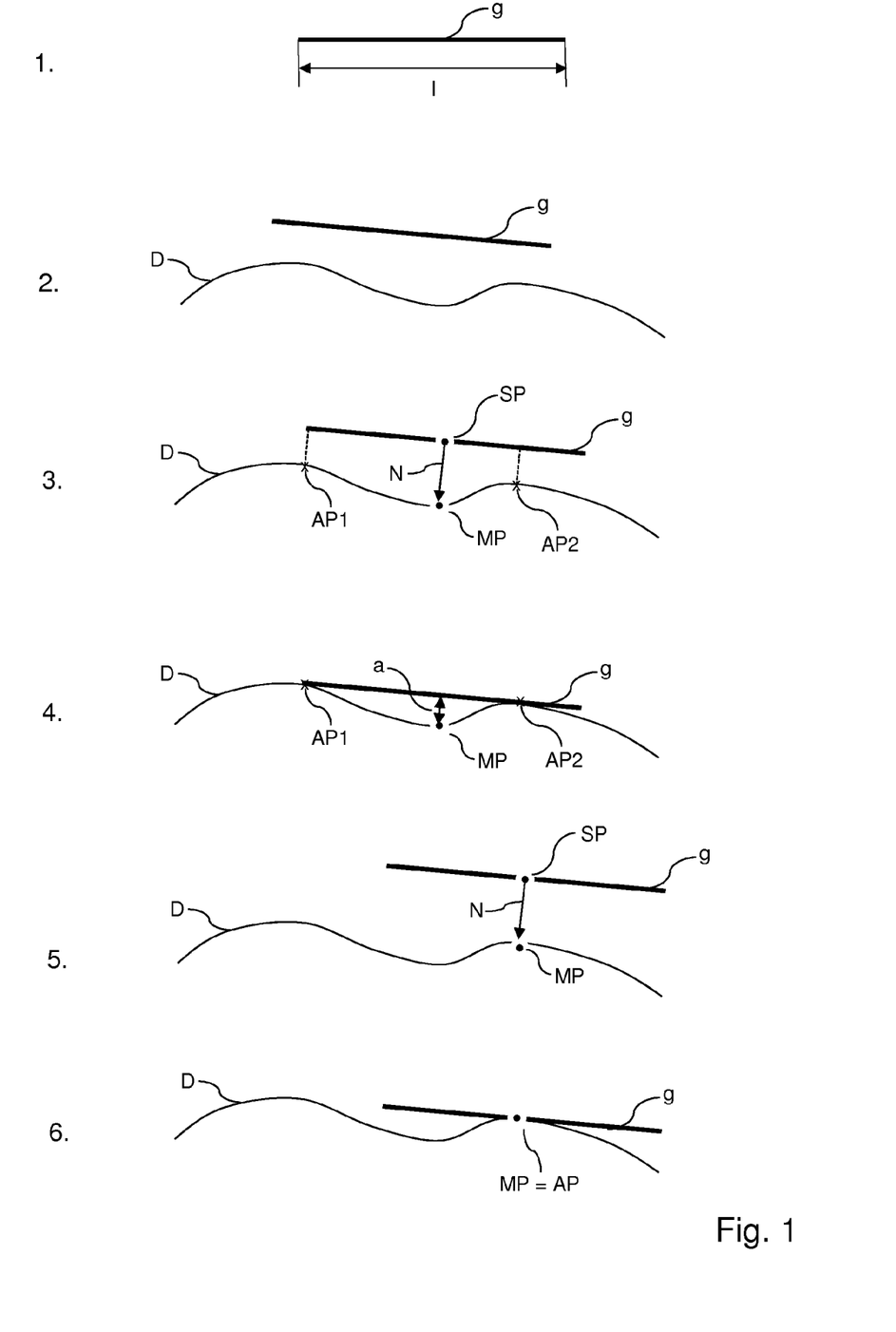
FIG. 1 in a schematic illustration an exemplary embodiment of a method according to the invention with a straight section serving as the filter element being a concave filter, FIG. 2 in a schematic illustration an exemplary embodiment of the method according to the invention with a straight section serving as the filter element being a convex filter, FIG. 3 a diagram in which, based on an example of a section around a handle recess of a vehicle door, a concave filter is shown, and FIG. 4 diagrams with partially inverted measurements, FIG. 5 in a schematic illustration an exemplary embodiment of the method according to the invention with a straight section serving as the filter element being a concave filter, in which the filter element rests below two supporting points by an amount that can be determined, and FIG. 6 in a schematic illustration, an exemplary embodiment of a method according to the invention with a straight section serving as the filter element being a concave filter, in which the filter element rests under the supporting point by an amount that can be determined.

FIG. 1 shows in a schematic illustration an exemplary embodiment of the method according to the invention with a straight section serving as a filter element being a concave filter. The process of the method according to the invention is explained based on steps 1. to 6. The straight section serves as the filter element. For reasons of simplification, in the following only the term straight section is used, which may also relate to any filter element in general.

According to step 1, a straight section is selected as the virtual filter element. It serves as a concave filter for detecting concave sections in planar or convex surfaces. A defined length l is allocated to the straight section.

In step 2. the straight section g and the three-dimensional measurements D are shown schematically The measurements D include individual measuring points and represent an essentially convex surface with a concave section. The straight section g approaches, as a concave filter, the surface and/or the measurements D from the convexly arched side.

Step 3. shows the alignment of the straight section g with regards to the measurements D. The straight section g shows a center of gravity SP. The center of gravity SP is located in the middle of the straight section g. The normal N is defined as starting at the center of gravity SP. The normal N is aligned perpendicular to the straight section g and shows a selected measuring point MP. The alignment of the straight section g as parallel as possible is done automatically with regards to the measurements D. Here, a compensation straight, not shown, is calculated from the observed 3D-measuring point MP and the surrounding measuring points and the incline is determined from this. The straight section g is aligned such that it shows the same incline as the compensation straight. Accordingly, the straight section g is largely aligned parallel in reference to the measurements D.

The observed measuring point MP is located in a concave section of the measurements D. Subsequent to the alignment of the straight section g, the supporting points AP1 and AP2 are determined. Here, at both sides of the center of gravity SP of the straight section g, the highest point of the measurements D is determined, i.e. the respective point with the shortest distance from the straight section g. This way the supporting points AP1 and AP2 are defined. Subsequently, the straight section g approaches the measurements D along the normal N until the straight section g rests on the supporting points AP1 and AP2.

This situation is shown in step 4. The straight section g rests on the supporting points AP1 and AP2 on the measurements D. The distance a is measured and/or calculated along the normal alignment N and allocated to the presently observed measuring point MP.

In step 5. and step 6. the observed measuring point MP is located, deviating from the steps 3. and 4., in a convex section of the surface. The straight section g is aligned as parallel as possible in reference to the measurements D, as described in step 3., using a compensation straight. However, the observed measuring point MP is the highest point of the convex partial area, i.e. the point with the shortest distance from the straight section g. This way, the presently observed measuring point MP and the supporting point AP for the straight section g coincide. The straight section g approaches the measurements D along its normal N until the straight section g rests on the supporting point AP and/or on the measuring point MP.

This situation is shown in step 6. The straight section g rests on the supporting point AP and/or on the presently observed measuring point MP. The distance measured between the measuring point MP and the straight section g is zero. This measurement is allocated to the presently observed measuring point MP.

Figure 2:
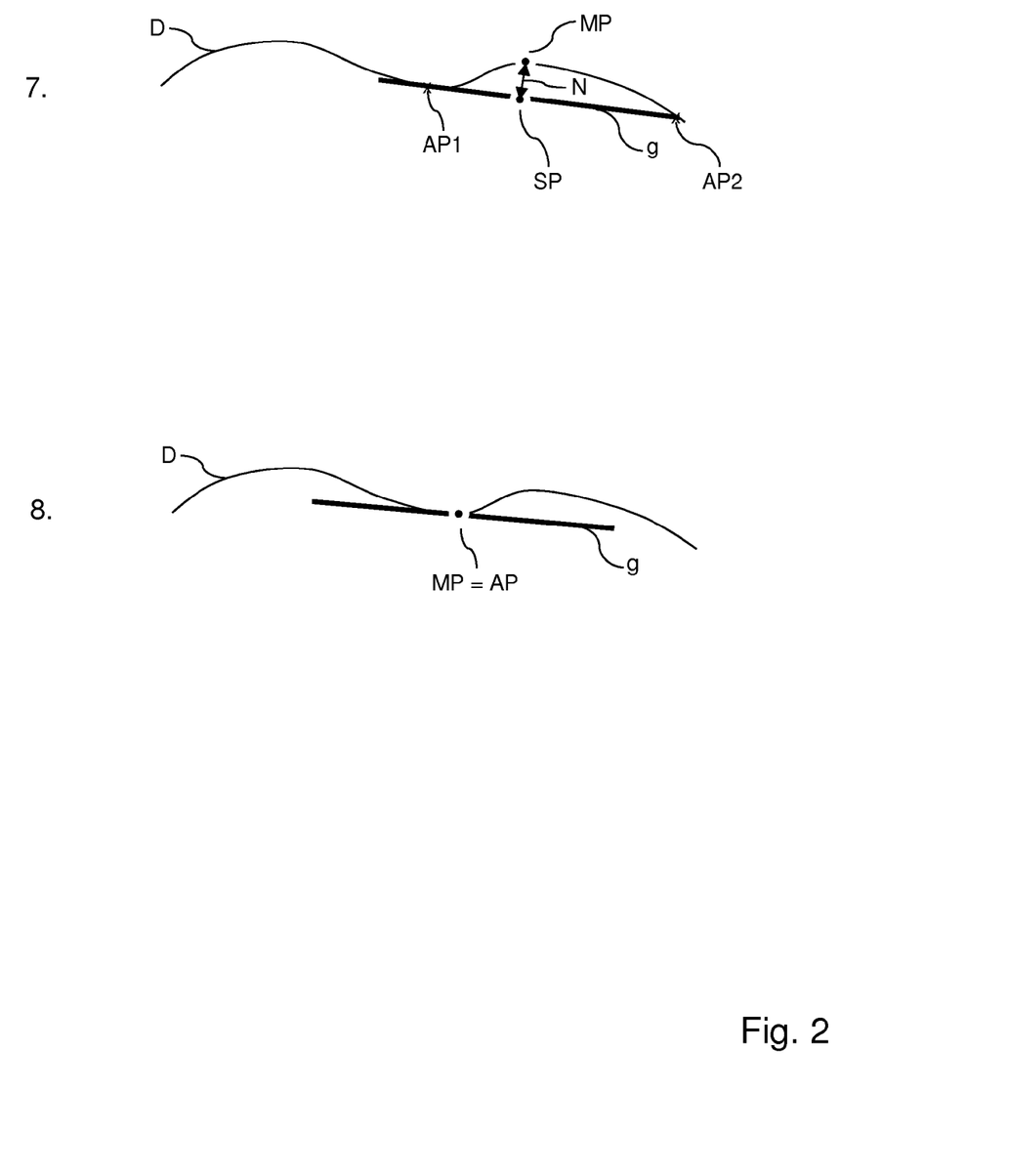

FIG. 2 shows in a schematic illustration an exemplary embodiment of the method according to the invention with a straight section serving as the filter element being a convex filter. Here, the straight section g is used as a convex filter for detecting convex partial areas in essentially concave surfaces. The straight section g approaches the surface and/or the measurements D as a convex filter from the concavely arched side. The straight section g is aligned as parallel as possible in reference to the measurements D, similar to the alignment of the concave filter, so that in order to avoid repetitions, reference is made to the explanations regarding step 3, in FIG. 1.

Step 7. FIG. 2 shows the straight section g and the measurements D in a schematic fashion. The straight section g has already approached the measurements D, after alignment. The presently observed measuring point MP is located in a convex partial area. The straight section g rests on the supporting points AP1 and AP2 on the measurements D. Along the normal N, the distance a is calculated and allocated to the presently observed measuring point MP.

In step 8. the presently observed measuring point MP is located in a concave partial area of the measurements D. The straight section g is already positioned as parallel as possible in reference to the measurements D and guided or displaced along its normal towards the measurements so that the straight section g rests on said measurements D. Here, the placement point AP, similar to step 6. in FIG. 1, represents the presently observed measuring point MP. The distance between the straight section g and the presently observed measuring point MP is therefore zero. This measurement is allocated to the present measuring point.

Figure 3:
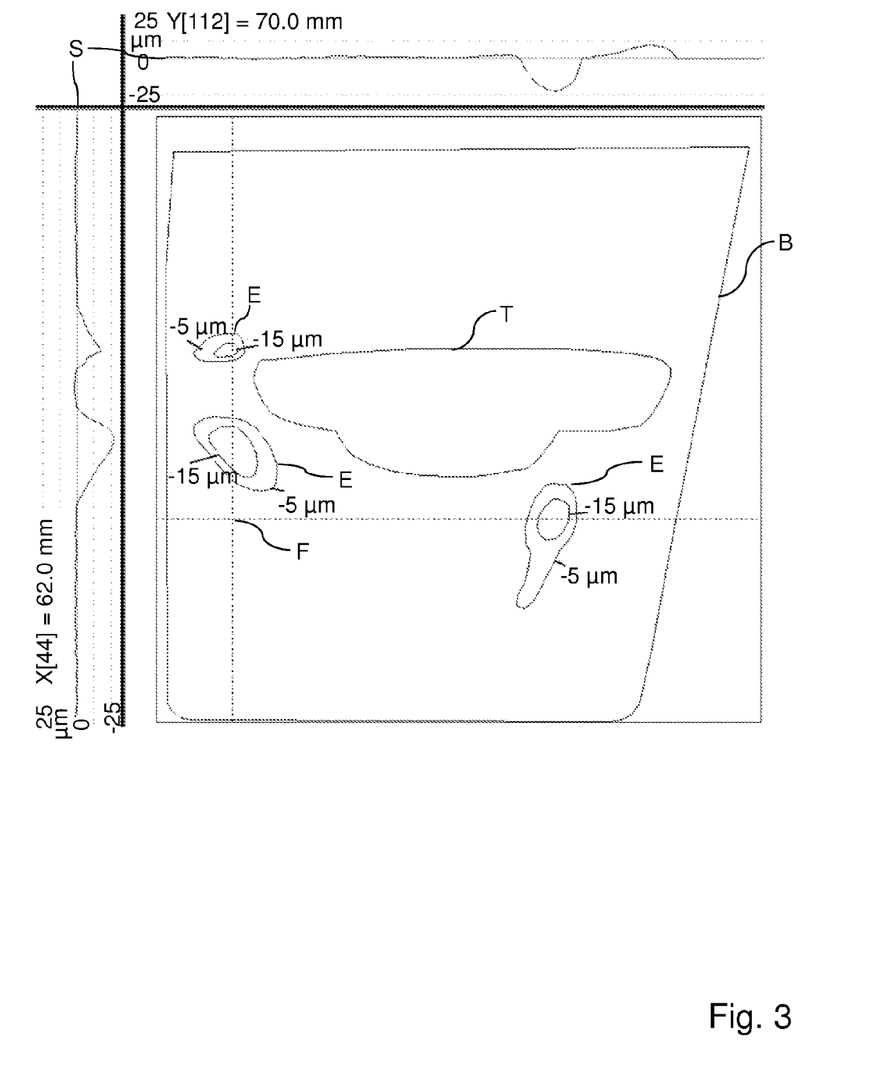

FIG. 3 shows a diagram in which the measurements of a concave filter are shown, for example, in the area around a handle recess of a vehicle door. Several indentations or recesses E are discernible in the measuring area B. Using the cross-hairs F, the sectional positions are marked in two coordinate directions, with the cross-sections S being shown accordingly. No measurements were taken in the area of the door handle recess T. The indentations or recesses E are clearly discernible and can be precisely evaluated by approaching or selecting via the cross-hairs.

Figure 4:
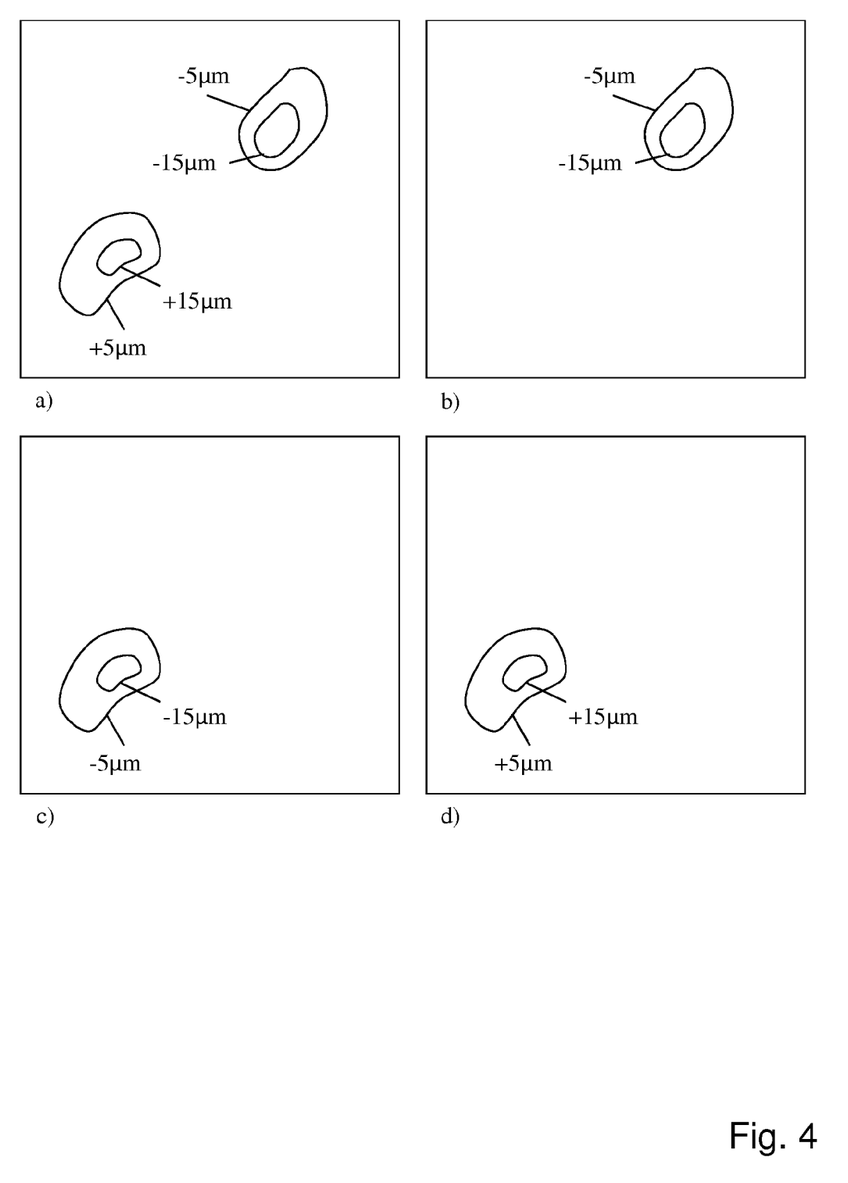

FIG. 4 shows several diagrams with partially inverted measurements. The diagram a) shows measurements with an elevated and a recessed deviation of the surface form. Elevations are provided with a positive algebraic sign, recesses with a negative one. The result can be inverted in order to illustrate convex surfaces in concave areas. A recess in the rear is equivalent to an elevation in the front. In the diagram b) the recess, i.e. the recessed deviation, is shown by the concave filter. The numeric values show a negative algebraic sign. In the diagram c) an elevated deviation of the rear is shown with the convex filters. Seen from the rear, these deviations are recessed; accordingly the numeric values are negative. In the diagram d) the elevation, i.e. the elevated deviation, is shown with a positive numeric value.

Figure 5:
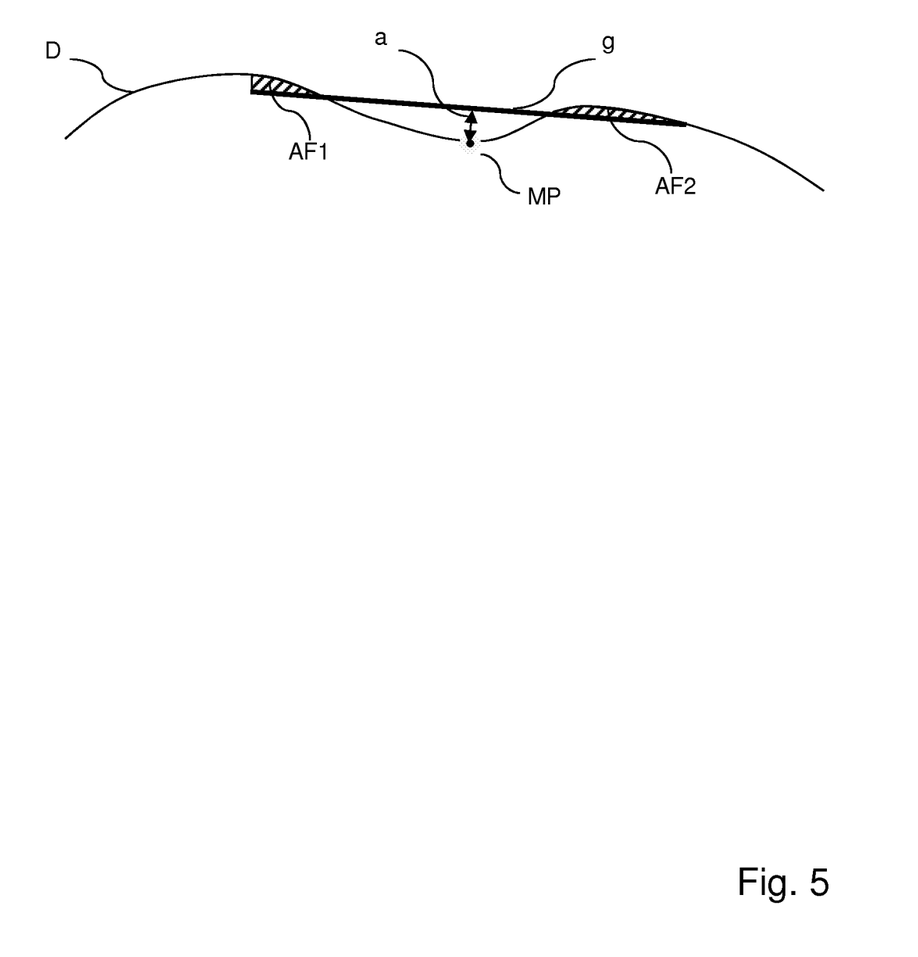

FIG. 5 shows in a schematic illustration an exemplary embodiment of the method according to the invention with a straight section serving as the filter element being a concave filter. The alignment of the straight section g as parallel as possible with regards to the measurements D occurs similar to the alignment of the concave filter, so that, in order to avoid repetitions, reference is made to step 3. in FIG. 1. Deviating from step 4, in FIG. 1 the straight section is arranged such that the areas AF1 and AF2 shown hatched are each of identical size and are equivalent to a certain predetermined amount, the parameter "force".

Figure 6:
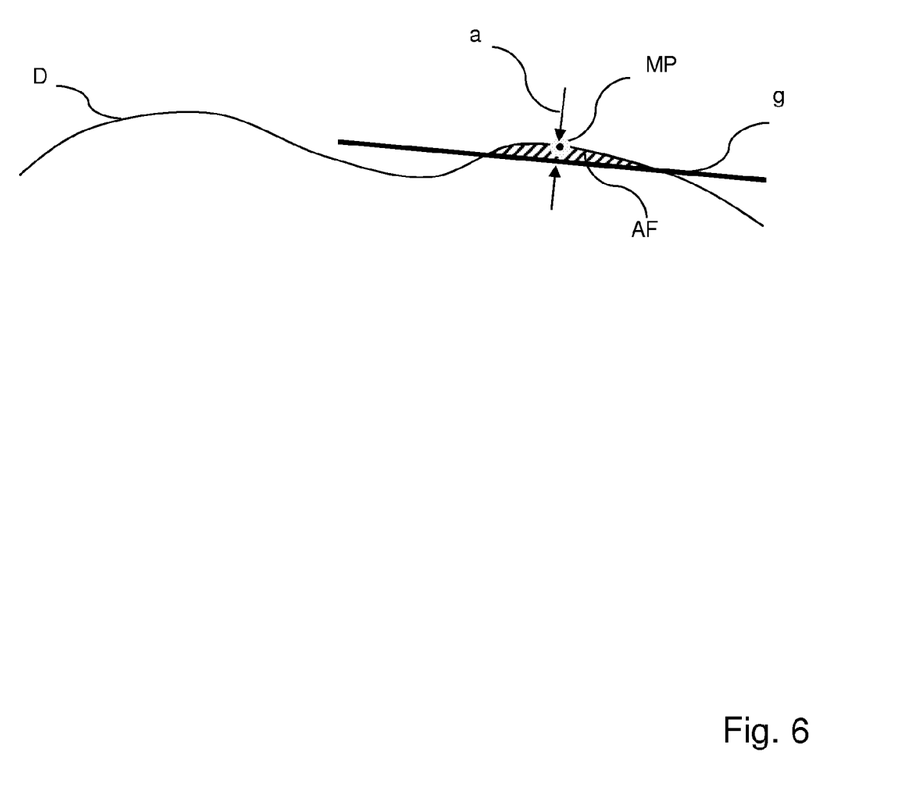

FIG. 6 shows in a schematic illustration an exemplary embodiment of the method according to the invention with a straight section serving as the filter element being a concave filter. The straight section g is aligned as parallel as possible in reference to the measurements D similar to the alignment of the concave filter, so that in order to avoid repetitions, reference is made to the explanations of step 5. in FIG. 1. Deviating from step 6., in FIG. 1 the straight section is arranged such that the areas AF shown hatched are equivalent to a certain predetermined amount, the parameter "force". In an advantageous fashion it shall apply that AF=AF1+AF2.

With regards to further advantageous embodiments of the device according to the invention and for the purpose of avoiding repetition, reference is hereby made to the general portion of the description and to the attached claims.

Finally, it is hereby expressly pointed out that the above-described exemplary embodiments of the method according to the invention only serve to explain the claimed teaching, and the teaching is not restricted to the embodiments.

LIST OF REFERENCE CHARACTERS a Distance
AF, AF1, AF2 Area
AP, AP1, AP2 Supporting point
B Measuring range
D Measurements
E Recess
F Cross-hairs
g Straight section
MP Measuring point
N Normal
S Cross-section
T Recess for door handle

The invention claimed is:

1. A method for detecting and measuring local deviations from the form of at least one of planar, curved, or arched surfaces of a test object, with three-dimensional measurements of the at least one surfaces being evaluated with an evaluation device, wherein:
the evaluation device uses at least one of:
at least one virtual filter element as a concave filter for detecting partial areas in planar or convex surfaces; or
at least one convex filter for detecting convex partial areas in planar or concave surfaces, such that the at least one virtual filter element determines values of deviations from the form that are displayed via a display device as measurements; and
the filter element is at least one of:
oriented as parallel as possible in reference to the measurements; or
aligned with regards to measuring points of the measurements respectively such that a presently observed measuring point is located on a normal of the filter element.

2. A method according to claim 1, wherein the filter element is embodied as at least one of a straight section or as a planar element.

3. A method according to claim 1, wherein the filter element is oriented, via at least one of a compensation straight or a compensation level, through the presently observed measuring point and several surrounding measuring points of the measurements.

4. A method according to claim 1, wherein at least one measuring point of the measurements, showing the shortest distance from the filter element, is defined as the supporting point, with the filter element being displaced along its normal in the direction of the measurements such that the filter element rests on the supporting point.

5. A method according to claim 1, wherein the distance between the filter element and the observed measuring point is measured in the direction of the normal of the filter element or in a defined direction, particularly a coordinate direction.

6. A method according to claim 1, wherein the concave filter approaches the measurements from the convexly arched side and/or that the convex filter approaches the measurements from the concavely arched side.

7. A method according to claim 1, wherein the measurements are shown at least one of:
as gray values or in a colored illustration in a diagram; or
projected by a projector on the test object.

8. A method for detecting and measuring local deviations from the form of at least one of planar, curved, or arched surfaces of a test object, with three-dimensional measurements of the at least one surfaces being evaluated with an evaluation device,
wherein:
the evaluation device uses at least one of:
at least one virtual filter element as a concave filter for detecting partial areas in planar or convex surfaces; or
at least one convex filter for detecting convex partial areas in planar or concave surfaces, such that the at least one virtual filter element determines values of deviations from the form that are displayed via a display device as measurements; and
the measurements are filtered prior to processing with the virtual filter element with smoothing filters selected from the group consisting of median-filters and Gauss-filters.

9. A method for detecting and measuring local deviations from the form of at least one of planar, curved, or arched surfaces of a test object, with three-dimensional measurements of the at least one surfaces being evaluated with an evaluation device,
wherein:
the evaluation device uses at least one of:
at least one virtual filter element as a concave filter for detecting partial areas in planar or convex surfaces; or
at least one convex filter for detecting convex partial areas in planar or concave surfaces, such that the at least one virtual filter element determines values of deviations from the form that are displayed via a display device as measurements; and
the measurements are filtered after processing with the virtual filter element using at least one of high-pass filters or low-pass filters.

10. A method according to claim 1, wherein for reasons of simplification and/or data reduction, only selected measuring points are evaluated by the filter element, points are determined on the filter element, with the evaluation occurring via the distance from at least one of the measurements or the equidistant scatterplot is used for the measurements.

11. A method for detecting and measuring local deviations from the form of at least one of planar, curved, or arched surfaces of a test object, with three-dimensional measurements of the at least one surfaces being evaluated with an evaluation device,
wherein:
the evaluation device uses at least one of:
at least one virtual filter element as a concave filter for detecting partial areas in planar or convex surfaces; or
at least one convex filter for detecting convex partial areas in planar or concave surfaces, such that the at least one virtual filter element determines values of deviations from the form that are displayed via a display device as measurements; and
the orientation of the filter element is predetermined for each measuring point or for selected measuring points of the measuring data.

12. A method for detecting and measuring local deviations from the form of at least one of planar, curved, or arched surfaces of a test object, with three-dimensional measurements of the at least one surfaces being evaluated with an evaluation device,
wherein:
the evaluation device uses at least one of:
at least one virtual filter element as a concave filter for detecting partial areas in planar or convex surfaces; or
at least one convex filter for detecting convex partial areas in planar or concave surfaces, such that the at least one virtual filter element determines values of deviations from the form that are displayed via a display device as measurements; and
the filter element is reduced in size to avoid any artifacts in the edge regions of the surface or in areas of the surface not measured.

13. A method for detecting and measuring local deviations from the form of at least one of planar, curved, or arched surfaces of a test object, with three-dimensional measurements of the at least one surfaces being evaluated with an evaluation device,
wherein:
the evaluation device uses at least one of:
at least one virtual filter element as a concave filter for detecting partial areas in planar or convex surfaces; or
at least one convex filter for detecting convex partial areas in planar or concave surfaces, such that the at least one virtual filter element determines values of deviations from the form that are displayed via a display device as measurements; and
the measurements of the convex filter are inverted for a joint illustration in a diagram together with the measurements of the concave filter.

14. A method for detecting and measuring local deviations from the form of at least one of planar, curved, or arched surfaces of a test object, with three-dimensional measurements of the at least one surfaces being evaluated with an evaluation device,
wherein:
the evaluation device uses at least one of:
at least one virtual filter element as a concave filter for detecting partial areas in planar or convex surfaces; or
at least one convex filter for detecting convex partial areas in planar or concave surfaces, such that the at least one virtual filter element determines values of deviations from the form that are displayed via a display device as measurements; and
the filter element is located below the supporting point by an amount that can be determined, particularly by a parameter force.

15. A method for detecting and measuring local deviations from the form of at least one of planar, curved, or arched surfaces of a test object, with three-dimensional measurements of the at least one surfaces being evaluated with an evaluation device,
wherein:
the evaluation device uses at least one of:
at least one virtual filter element as a concave filter for detecting partial areas in planar or convex surfaces; or
at least one convex filter for detecting convex partial areas in planar or concave surfaces, such that the at least one virtual filter element determines values of deviations from the form that are displayed via a display device as measurements; and
at least one of the size, form, or orientation of the filter element and/or the selection of a concave filter or a convex filter is calculated from the CAD-data.

16. A method for detecting and measuring local deviations from the form of at least one of planar, curved, or arched surfaces of a test object, with three-dimensional measurements of the at least one surfaces being evaluated with an evaluation device,
wherein:
the evaluation device uses at least one of:
at least one virtual filter element as a concave filter for detecting partial areas in planar or convex surfaces; or
at least one convex filter for detecting convex partial areas in planar or concave surfaces, such that the at least one virtual filter element determines values of deviations from the form that are displayed via a display device as measurements; and
the flexibility of the filter element is predetermined.

17. A method for detecting and measuring local deviations from the form of at least one of planar, curved, or arched surfaces of a test object, with three-dimensional measurements of the at least one surfaces being evaluated with an evaluation device,
wherein:
the evaluation device uses at least one of:
at least one virtual filter element as a concave filter for detecting partial areas in planar or convex surfaces; or at least one convex filter for detecting convex partial areas in planar or concave surfaces, such that the at least one virtual filter element determines values of deviations from the form that are displayed via a display device as measurements; and the measuring data is determined by measuring a surface as measuring points, particularly as scatterplot, or as geometric area data, particularly provided with selected measuring points.

18. A method according to claim 17, wherein the measurements to be processed and/or the calculated measurements are preprocessed and/or post-processed via CAD-comparison, associative storage, and/or polynomial approximation.

19. A method for detecting and measuring local deviations from the form of at least one of planar, curved, or arched surfaces of a test object, with three-dimensional measurements of the at least one surfaces being evaluated with an evaluation device, wherein:

the evaluation device uses at least one of:

at least one virtual filter element as a concave filter for detecting partial areas in planar or convex surfaces; or at least one convex filter for detecting convex partial areas in planar or concave surfaces, such that the at least one virtual filter element determines values of deviations from the form that are displayed via a display device as measurements; and the measurements are repeatedly filtered with different filter elements, particularly with concave filters and convex filters, with preferably an overall result calculated from the results of the individual filter processes by way of data fusion.

20. A method for detecting and measuring local deviations from the form of at least one of planar, curved, or arched surfaces of a test object, with three-dimensional measurements of the at least one surfaces being evaluated with an evaluation device, wherein:

the evaluation device uses at least one of:

at least one virtual filter element as a concave filter for detecting partial areas in planar or convex surfaces; or at least one convex filter for detecting convex partial areas in planar or concave surfaces, such that the at least one virtual filter element determines values of deviations from the form that are displayed via a display device as measurements; and in addition to three-dimensional measurements, data of other dimensions or physical parameters are also processed, such as at least one of 2D-data or 4D-data.

21. An evaluation device for evaluating three-dimensional measurements during the execution of a method according to claim 1, wherein:

the evaluation device comprises at least one virtual filter element as a concave filter for detecting concave partial areas in planar or convex surfaces and/or as a convex filter for detecting convex partial areas in planar or concave surfaces; and a display device is allocated to the evaluation device for displaying the measurements.

22. A device according to claim 21, wherein at least one of:

a device is provided for the optic, particularly three-dimensional measurement of the test object, or a projector is provided for projecting measurements, particularly on the test object.

* * * * *